(12) United States Patent
Thomson et al.

(10) Patent No.: US 7,944,815 B2
(45) Date of Patent: May 17, 2011

(54) SYSTEM AND METHOD FOR NETWORK RECOVERY FROM MULTIPLE LINK FAILURES

(75) Inventors: Graeme Thomson, Christchurch (NZ); Cristian Radu, Bucharest (RO); Andrew Riddell, Christchurch (NZ); Frank Wei, Wellington (NZ)

(73) Assignee: Allied Telesis Holdings K.K., Tokyo (JP)

( * ) Notice: Subject to any disclaimer, the term of this patent is extended or adjusted under 35 U.S.C. 154(b) by 178 days.

(21) Appl. No.: 12/371,272

(22) Filed: Feb. 13, 2009

(65) Prior Publication Data

US 2009/0207726 A1    Aug. 20, 2009

Related U.S. Application Data

(60) Provisional application No. 61/064,078, filed on Feb. 14, 2008, provisional application No. 61/081,574, filed on Jul. 17, 2008, provisional application No. 61/076,040, filed on Jun. 26, 2008.

(51) Int. Cl.
*H04J 1/16* (2006.01)
(52) U.S. Cl. .................................................... 370/222
(58) Field of Classification Search .......... 370/216–220, 370/222–224
See application file for complete search history.

(56) References Cited

U.S. PATENT DOCUMENTS

| 7,003,705 | B1 * | 2/2006 | Yip et al. ..................... 714/717 |
| 7,564,779 | B2 * | 7/2009 | Rose et al. .................... 370/223 |
| 7,636,299 | B2 * | 12/2009 | Asa et al. ..................... 370/216 |
| 2003/0165119 | A1 * | 9/2003 | Hsu et al. ..................... 370/258 |
| 2003/0208618 | A1 * | 11/2003 | Mor et al. .................... 709/238 |
| 2004/0081083 | A1 * | 4/2004 | Sekihata ....................... 370/222 |
| 2004/0179471 | A1 * | 9/2004 | Mekkittikul et al. ......... 370/218 |
| 2004/0223503 | A1 * | 11/2004 | Lynch et al. ................ 370/404 |
| 2005/0201275 | A1 * | 9/2005 | Ying et al. ................... 370/222 |
| 2007/0165517 | A1 * | 7/2007 | Binetti et al. ............... 370/222 |
| 2007/0171814 | A1 * | 7/2007 | Florit et al. .................. 370/216 |
| 2007/0237072 | A1 * | 10/2007 | Scholl .......................... 370/222 |
| 2009/0016214 | A1 * | 1/2009 | Alluisi et al. ................ 370/228 |
| 2009/0296569 | A1 * | 12/2009 | Ramalho Ribeiro Dos Santos et al. ............................ 370/222 |

* cited by examiner

*Primary Examiner* — Kwang B Yao
*Assistant Examiner* — Juvena Loo
(74) *Attorney, Agent, or Firm* — Arent Fox, LLP (57) ABSTRACT

Methods and systems for fast and reliable network recovery from multiple link failures. In accordance with one example of the method, a master node receives a request from a transit node having a blocked port to open the blocked port for data forwarding, wherein the blocked port is associated with a restored link. The master node starts a health-check timer and transmits a health-check message on its primary port to determine that all failed links of the network are restored. Upon determining that the health-check message is received at its secondary port, the master node transmits a message to each transit node indicating that all failed links are restored. Upon determining that the health-check message is not received at its secondary port before the health-check timer lapsed, the master node transmits a message to the transit node to open the blocked port associated with the restored link for data forwarding.

15 Claims, 7 Drawing Sheets

SYSTEM AND METHOD FOR NETWORK RECOVERY FROM MULTIPLE LINK FAILURES

CROSS-REFERENCE TO RELATED APPLICATIONS

This application claims benefit of priority of U.S. Provisional Application Ser. No. 61/064,078 filed Feb. 14, 2008, titled RING NETWORK TOPOLOGY MULTIPLE LINK BREAK RESILIENCY METHOD AND SYSTEM, U.S. Provisional Application Ser. No. 61/081,574 filed Jul. 17, 2008, titled ENHANCED RING NETWORK TOPOLOGY MULTIPLE LINK BREAK RESILIENCY METHOD AND SYSTEM, and U.S. Provisional Application Ser. No. 61/076,040 filed Jun. 26, 2008, titled ENHANCED RING NETWORK TOPOLOGY MULTIPLE LINK BREAK RESILIENCY METHOD AND SYSTEM. This application is also related to U.S. application Ser. No. 11/826,203 filed Jul. 12, 2007, titled METHOD AND SYSTEM FOR NETWORK RECOVERY FROM MULTIPLE LINK FAILURES. All of the above applications are incorporated by reference herein in their entirety.

TECHNICAL FIELD

The present application relates generally to the field of telecommunication networks and in particular to methods and systems for network recovery from multiple link failures.

BACKGROUND

The focus of modern network communications is directed to delivering services, such as broadcast video, Plain Old Telephone Service (POTS), Voice over Internet Protocol (VoIP), video on demand, and Internet access, and deploying these services over an Ethernet-based network. In recent years, the types of services provided, their quality and sophisticated implementation, have all been improving at a steady pace. In terms of providing uninterrupted network operations and fast responses to network link failures, however, today's Ethernet-based network communications are falling behind. Some additional shortcomings of existing Ethernet-based networks include unreliable self-recovery from multiple link failures, and inability to make the failures and the recovery transparent to the subscriber.

Existing network protocols, such as the Spanning Tree Protocol ("STP"), initially specified in ANSI/IEEE Standard 802.1D, 1998 Edition, and the Rapid Spanning Tree Protocol ("RSTP"), defined in IEEE Standard 802.1w-2001, are effective for loop-prevention and assuring availability of backup paths, and are incorporated by reference herein in their entirety. Although these protocols provide the possibility of disabling redundant paths in a network to avoid loops, and automatically re-enabling them when necessary to maintain connectivity in the event of a network failure, both protocols are slow in responding to and recovering from network failures. The response time of STP/RSTP to network failures is up to 30 seconds. This slow response to failures is due, in part, to the basics of STP/RSSTP operations, which are tied to calculating the locations of link breakage points on the basis of user-provided values that are compared to determine the best (or lowest cost) paths for data traffic.

Another existing network algorithm and protocol, Ethernet Protected Switched Ring ("EPSR"), developed by Allied Telesis Holdings Kabushiki Kaisha of North Carolina on the basis of Internet standards-related specification Request for Comments ("RFC") 3619, is a ring protocol that uses a fault detection scheme to alert the network that a failure has occurred, and indicates to the network to take action, rather than perform path/cost calculations. The EPSR, however, although much faster to recover from a single link failure than STP/RSTP, suffers from the drawback that recovery from multiple link failures is not possible, and traffic on the network cannot be restored (interchangeably referred to herein as "converged"), until recovery of all failed links. Moreover, self-recovery from multiple link failures is unreliable, and even if ultimately accomplished, is cumbersome and slow.

There is a general need, therefore, for methods and systems that provide network recovery from multiple link failure conditions. There is a further need for methods and systems that provide network recovery from multiple link failure conditions that are fast, provide reliable self-recovery from failures, and make the failures and the recovery unnoticeable to the subscriber, while preventing the forming of network loops.

SUMMARY OF THE INVENTION

Disclosed are systems and methods for recovery from single and multiple link failures in telecommunication networks comprising a master node and a plurality of transit nodes connected in ring configuration. In one example aspect, the master node receives a request from a transit node having a blocked port to open the blocked port for data forwarding, wherein the blocked port is associated with a restored link. The master node starts a health-check timer and transmits a health-check message on its primary port to determine that all failed links of the network are restored. Upon determination that the health-check message is returned to its secondary port, the master node transmits a message to each transit node indicating that all failed links are restored. Upon determination that the health-check message did not return to the secondary port before the health-check timer lapsed, the master node transmits a message to the transit nodes to open the blocked port associated with the restored link for data forwarding.

In another example aspect of the present invention, the transit node is configured to detect a failed link associated with one of its ports and to block the port associated with the failed link. Upon determining that physical connectivity has been restored to the failed link, the transit node starts a first timer and broadcasts on the open port a request for permission to open the blocked port for data forwarding. Upon determining that permission to open the blocked port is received from the master node before the timer lapses, the transit node opens the blocked port for data forwarding. The transit node is further configured to start a second timer and to rebroadcast the request for permission to open the blocked port for data forwarding when the first timer lapses, and the permission to open the blocked port is not received from the master node. Upon determining that the second timer lapsed, and permission to open the blocked port was not received from the master node, the transit node is configured to open the blocked port for data forwarding. It should be noted that the first and second timers and their respective time-periods are configurable by the user.

The disclosed network recovery systems and methods have numerous advantages including, but not limited to, enhancing the resiliency of a network ring in the case of single and multiple ring failures and preventing broadcast problems associated with prior art solutions.

BRIEF DESCRIPTION OF THE DRAWINGS

The accompanying drawings, which are incorporated into and constitute a part of this specification, illustrate one or more examples of aspects of the present invention and, together with the description, serve to explain the principles and implementations of aspects of the present invention.

In the drawings.

DETAILED DESCRIPTION

Aspects of the present invention are described herein in the context of a system and method for detecting and recovering from single or multiple link failures in ring-type networks. Those of ordinary skill in the art will recognize that the following description is illustrative only and is not intended to be in any way limiting. Other aspects will readily suggest themselves to such skilled persons having the benefit of this disclosure. Reference will now be made in detail to implementations of aspects of the present invention as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

For a more complete understanding of aspects of the present invention, the needs satisfied thereby, and the objects, features, and advantages thereof, an illustration will first be provided of an exemplary Ethernet Protected Switched Ring (EPSR) network recovery from a single link failure, and then an illustration will be provided of an exemplary EPSR-based network recovery from multiple link failures. Those of ordinary skill in the art will recognize that the disclosed systems and methods for network failure recovery are not limited to the Ethernet-based networks and may be readily applied to other types of communication networks, including wired and wireless networks, as well as different network protocols and topologies.

Figure 1:
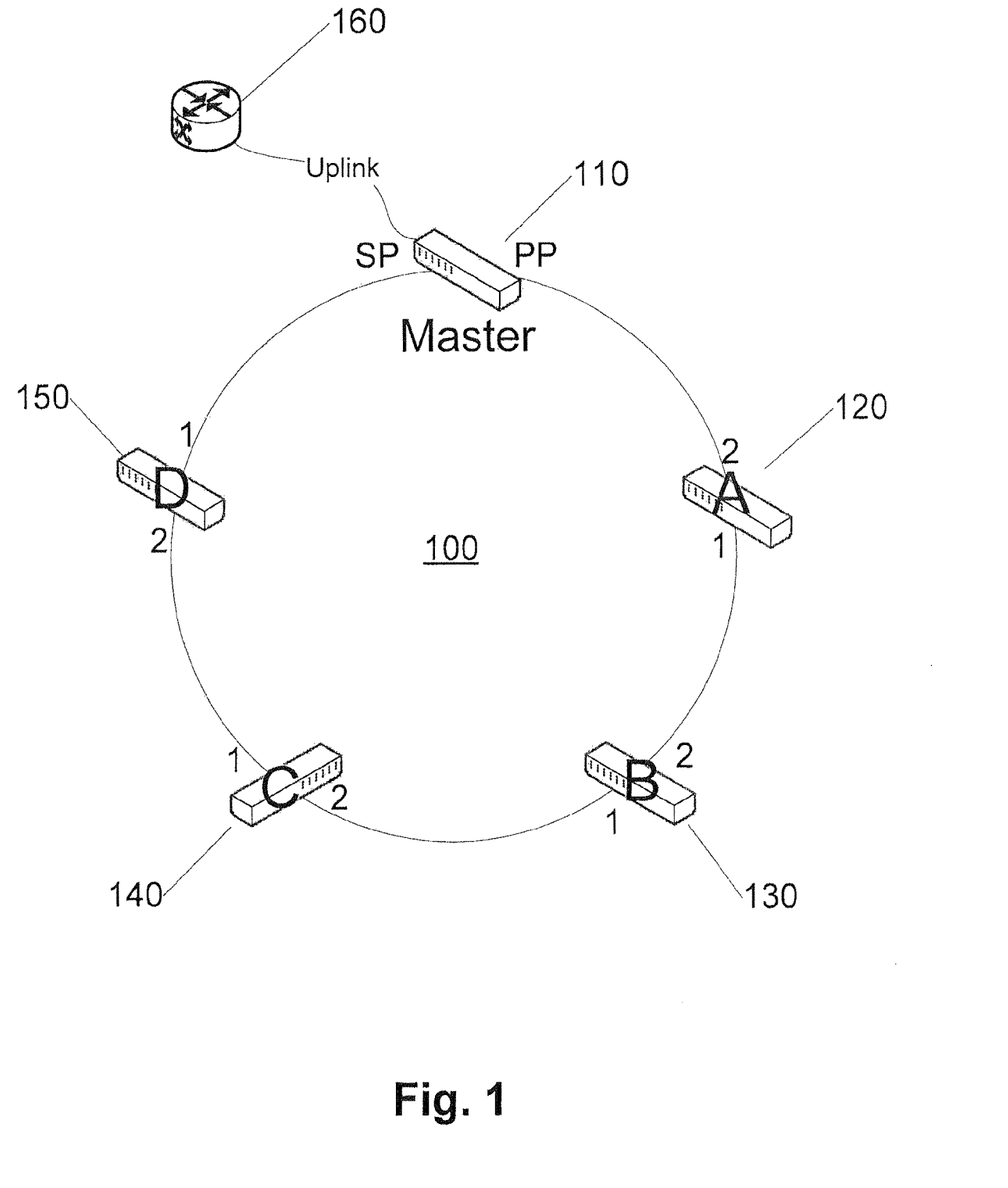
FIG. 1 illustrates the operation of an exemplary EPSR network in a normal (non-failed) state in accordance with one aspect of the present invention.

FIG. 1 illustrates the operation of an exemplary EPSR network in a normal (non-failed) state. An existing EPSR network 100, shown in FIG. 1, includes a plurality of network elements (interchangeably referred to herein as "nodes") 110-160, e.g., switches, routers, servers or other network elements, wherein each node 110-160 includes a plurality of ports. A single EPSR ring 100, hereinafter interchangeably referred to herein as an EPSR "domain," has a single designated "master node" 110. The EPSR domain 100 defines a protection scheme for a collection of data virtual local area networks ("VLANs"), a control VLAN, and the associated switch ports. The VLANs are connected via bridges, and each node within the network has an associated bridge table (interchangeably referred to herein as a "forwarding table") for the respective VLANs.

The master node 110 is the controlling network element for the EPSR domain 100, and is responsible for status polling, collecting error messages and controlling the traffic flow on an EPSR domain, and other functions. All other nodes 120-150 on that ring are classified as "transit nodes." In one aspect of the present invention, transit nodes 120-150 are configured to generate link failure notices and receive control messages from the master node 110.

Each node on the ring 100 has at least two configurable ports, primary (interchangeably referred to herein as "PP" or "1") and secondary (interchangeably referred to herein as "SP" or "2"), connected to the ring. The primary port PP of the master node 110 determines the direction of the traffic flow, and is always operational, in accordance with one aspect. In a normal operation scenario, the master node 110 blocks the secondary port SP for all non-control Ethernet messages belonging to the given EPSR domain, thereby preventing the formation of a loop in the ring. In normal operation, the secondary port SP of the master node 110 remains active, but blocks all protected VLANs from operating until a ring failure is detected. Existing Ethernet switching and learning mechanisms operate on this ring in accordance with known standards. This operation is possible because the master node 110 causes the ring to appear as though it contains no loop, from the perspective of the Ethernet standard algorithms used for switching and learning.

If the master node 110 detects a ring failure, it may unblock its secondary port SP and allows Ethernet data messages to pass through that port. A special "control VLAN" is provided that can always pass through all ports in the domain, including the secondary port SP of the master node 110. The control VLAN cannot carry any data traffic; however, it is capable of carrying control messages. Only EPSR control packets are therefore transmitted over the control VLAN. In various aspects of the present invention, network 100 may uses a polling mechanism and/or a fault detection mechanism (interchangeably referred to herein an "alert"), each of which is described in detail below, to verify the connectivity of the ring and quickly detect failures in the network.

Figure 2:
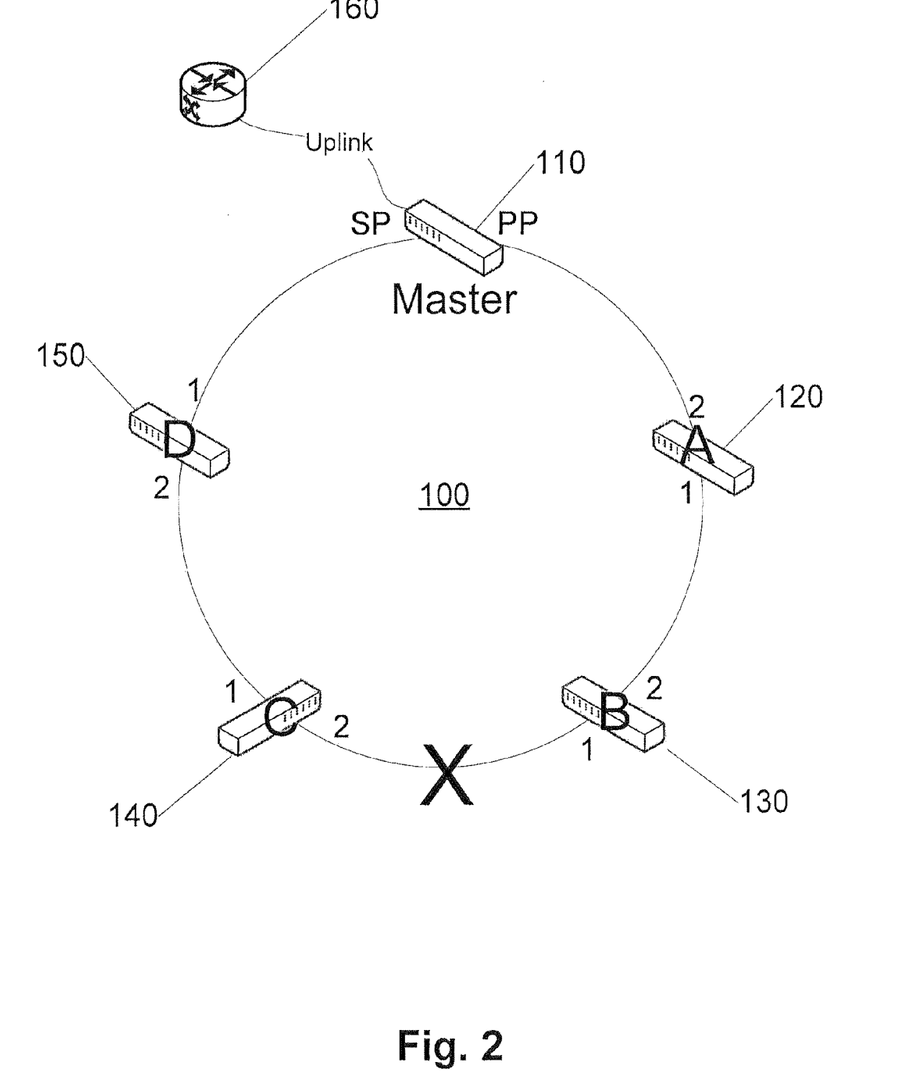
FIG. 2 illustrates the operation of an exemplary EPSR network upon single link failure and recovery from said failure in accordance with one aspect of the present invention.

In one example aspect of the present invention, a fault detection mechanism may be used to detect network failures, which will be described with reference to FIG. 2. Upon detection by a transit node 130 of a failure on any of its ports connected to the EPSR domain 100, that transit node immediately transmits a "link down" control message on the control VLAN to the master node 110. When the master node 110 receives this "link down" control message, the master node 110 transitions from a "normal" state to a "ring-fault" state and unblocks its secondary port SP. The master node 110 also flushes its bridge table, and sends a control message to remaining ring nodes 120-150, instructing them to flush their bridge tables, as well, Immediately after flushing its bridge table, each node learns the new topology, thereby restoring all communications paths.

In another example aspect of the present invention, a polling mechanism may be used to detect network failures, when, for example, due to an error, the "link down" alert message fails to reach master node 110. The ring polling mechanism will now be described in reference to FIG. 2. The master node 110 may be configured to periodically send a health-check message on the control VLAN. If the ring is complete, the health-check message will be received on the master node's secondary port SP. If, however, the master node 110 does not receive the health-check message, the master node 110 transitions from the normal state to the "ring-fault" state and unblocks its secondary port SP for forwarding network traffic. As with the fault detection mechanism, the master node also flushes its bridge table and transmits on both primary and secondary port a control message to remaining network nodes 120-150, instructing these nodes to also flush their bridge tables. Again, as with the fault detection mechanism, after flushing its bridge table, each node learns the new topology, thereby restoring all communications paths.

The master node 110 may continue to transmit periodic health-check messages out of its primary port PP, even when operating in a ring-fault state. Once the ring is restored, the next health-check message will be received on the secondary port SP of the master node 110. When a health check message is received at the secondary port SP of the master node 110, or when a "link-up" message is transmitted by a previously failed transit node 130, the master node 110 restores the original ring topology by blocking its secondary port SP to protected VLAN traffic, flushing its bridge table, and transmitting a "link-up" control message to the transit nodes 120-150 to flush their bridge tables, re-learn the topology, and restore the original communication paths. When transit nodes 130 and 140 receive link-up control message from the master node 110 they move ports B1 and C2, respectively, to forwarding, thereby restoring the original communication path.

During the period of time between: (a) detection by the transit nodes 130 and 140 that the link between them is restored; and (b) the master node 110 detecting that the ring 100 is restored, the secondary port SP of the master node remains open, thereby creating the possibility of a temporary loop in the ring. To prevent this loop from occurring, when the failed link first becomes operational, the affected transit nodes 130 and 140 keep ports B1 and C2 blocked and broadcast link forwarding request (LFR) messages to master node 110 asking permission to forward data on ports B1 and C2. In response to these messages, the master node 110 sends a health-check message from its primary port PP to determine if the network has recovered in which case the health-check message will be successfully received at its secondary port SP. The master node 110 may then re-block its secondary port SP and then send a permission to move to link forward (PLF) message to transit nodes 130 and 140. The master node 110 may then flush its forwarding table and transmit a network restored "ring-up flush" control message to the transit nodes 120-150. In response, the transit nodes 120-150 flush their bridge tables and unblock the ports associated with the newly restored link, thereby restoring the ring to its original topology, and restoring the original communications paths. Since no calculations are required between nodes, the original ring topology can be quickly restored, (e.g., in 50 milliseconds or less), with no possibility of an occurrence of a network loop when the failed link is first restored and the master node 110 still has its secondary port SP open to protected VLAN traffic.

Figure 3:
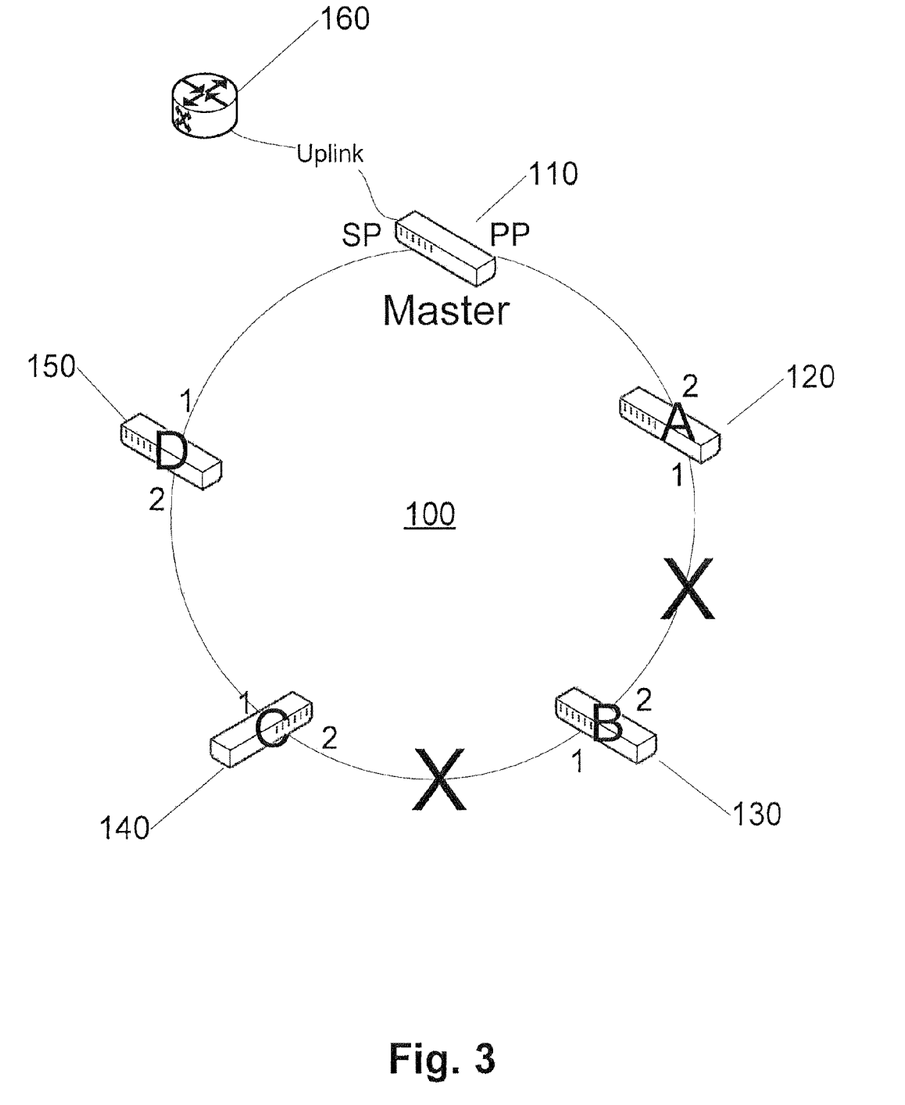
FIG. 3 illustrates operation of an exemplary EPSR network upon multiple link failure and recovery from said failure in accordance with one aspect of the present invention.

FIG. 3 illustrates the situation where two adjacent links A1-B2 and B1-C2 in ring 100 fail. The transit nodes 120, 130 and 140, affected by the link failure, block their corresponding ports to prevent a loop from occurring when one or both of the links recover. As in the case with network recovery from single link failure, all other transit nodes have both ring ports in a forwarding state, and the master node 110 has its primary port PP in the forwarding state. When a link failure is detected, either via link-down control message from a transit node or a failure to receive a health-check message, the master node 110 may unblock its secondary port SP to allow network traffic to nodes 140 and 150. As a result, only transient node 130 remains completely isolated from the network 100 because it is separated from the network via failed links.

Upon recovery of link A1-B2, the two affected transit nodes 120 and 130 must determine whether it is safe (e.g., without significant risk of looping) to unblock the ports, on each side of the failed link. To that end, nodes 120 and 130 may send link forwarding request (LFR) messages to master node 110 requesting permission to forward data on ports A1 and B2. When the master node 110 receives these requests, after it transmits its next health-check message, it may start a "health-check" timer in accordance with one example aspect of the present invention. If the timer lapses and a health-check message has not been received, master node 110 messages transit nodes 120 and 130 with permission to move their ports A1 and B2, respectively, to data forwarding. When both ports A1 and B2 are restored to data forwarding, all nodes have connectivity and the system has been restored to the single link (B1-C2) failure scenario described above.

Figure 4:
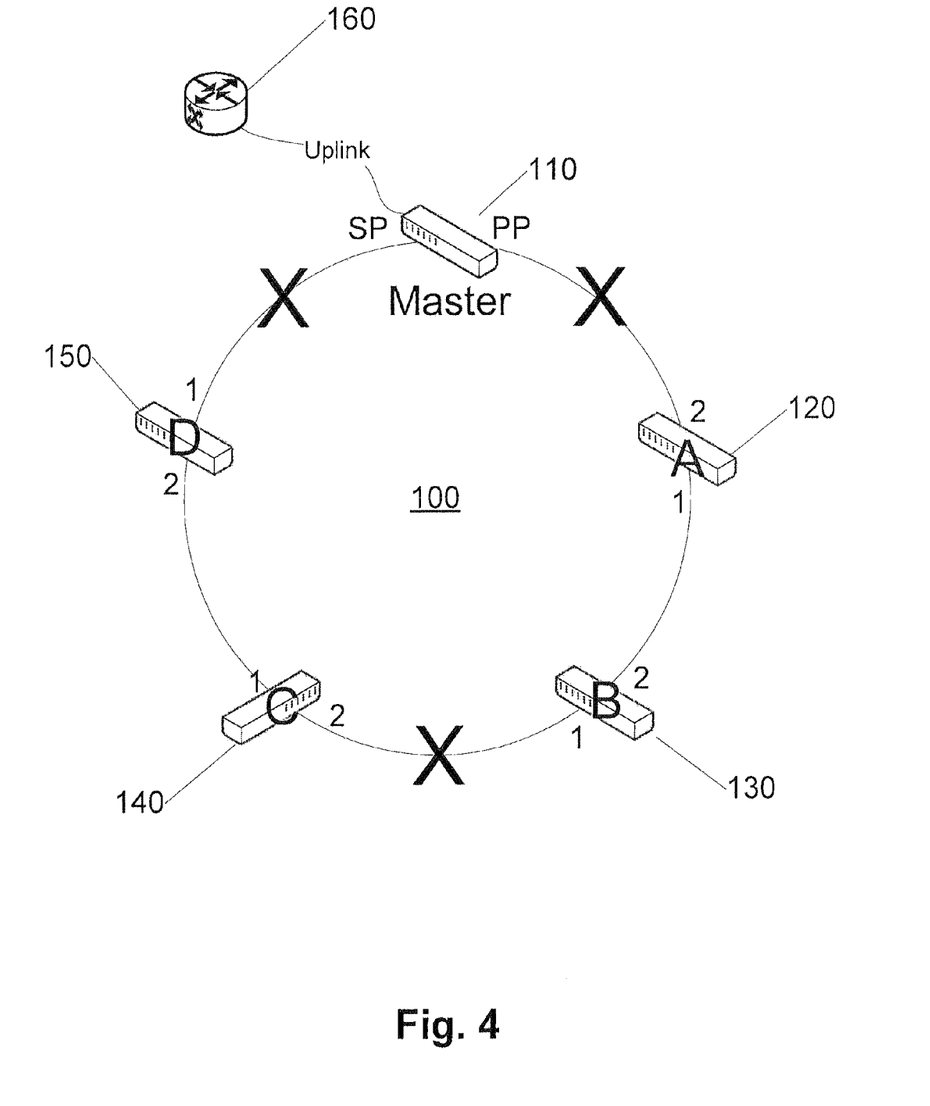
FIG. 4 illustrates operation of an exemplary EPSR network upon multiple link failure and recovery from said failure in accordance with another aspect of the present invention.

FIG. 4 illustrates the scenario in which multiple links, including links connecting the master node 110 have failed. When links D1-MasterSP and A2-MasterPP fail, the connectivity from master node 110 to nodes 120-150 is blocked. The connectivity between nodes 130 and 140 has also failed, and ports B1 and C2 are automatically blocked. When the connectivity on the link B1-C2 is restored, nodes 130 and 140 send link forward request (LFR) messages to the master node 110 asking for permission to forward data to ports B1 and C2, respectively. At the same time, each transit node may start an LFR timer in accordance with one variation. Since the master node 110 is still isolated from nodes 130 and 140, no response is received to the LFR messages. When their individual LFR timers expire, nodes 130 and 140 may automatically place links B1 and C2, respectively, into the forwarding state in accordance with one aspect of the present invention. Thus, network segments AB and CD are connected together even though the master node 110 is unreachable from either network segment.

Figure 5:
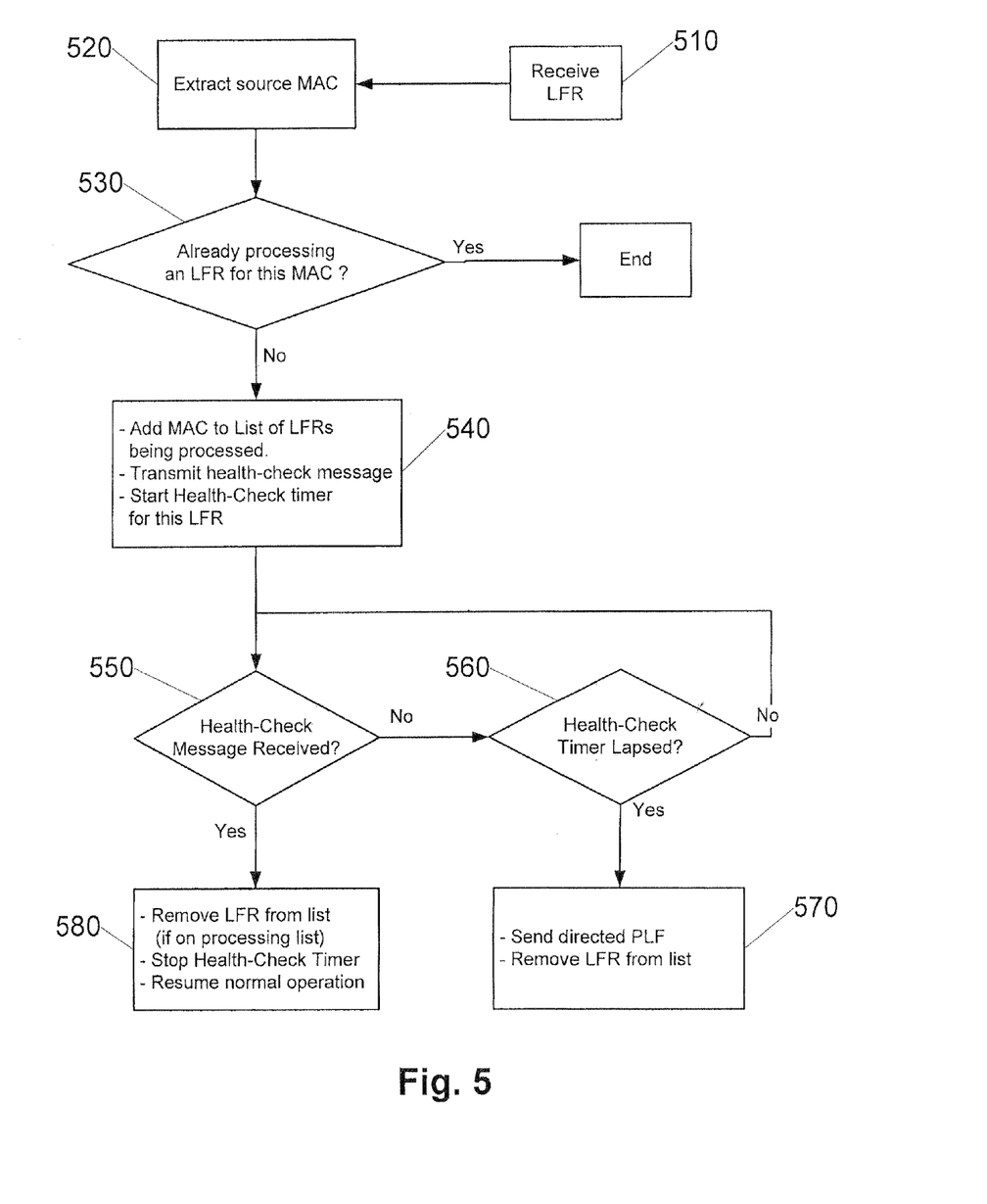
FIG. 5 presents a flow chart of a sequence of actions performed by the master node in case of a single or multiple link failure in accordance with one aspect of the present invention.

FIG. 5 illustrates a sequence of actions performed by the master node in case of single or multiple link failure in accordance with one aspect of the present invention. The process begins with the master node receiving a link forward request (LFR) message from one or more transit nodes, step 510. The LFR may be sent as a Layer 2 broadcast packet in accordance with one aspect. The master node extracts a unique identifier, such as the source Medium Access Control (MAC) address, step 520, and determines if a LFR message from the originating transit nodes has been previously received and is being processed, step 530. If a LFR message is not being processed, master node adds the unique identifier (e.g., MAC address) of the transit node to the list of LFR being processed, transmits a health-check message and starts a health-check timer for this LFR, step 540. If a health-check message is not received, step 550, and the health-check timer has lapsed, step 560, the master node may send a permission to move to link forward (PLF) message directly to the transit node that originated the LFR message and removes LFR from the list, step 570. This enables the transit node to open its ports for forwarding. If the health-check message returns to the master node (which indicates that physical connectivity is restored), step 550, the master node removes LFR from the list and stops health-check timer, step 580. The master node then flushes its bridge table and sends a control message to the transit nodes instructing them to flush their bridge tables, as well. Immediately after flushing its bridge table, each node learns the new topology, thereby restoring all communications paths.

Figure 6:
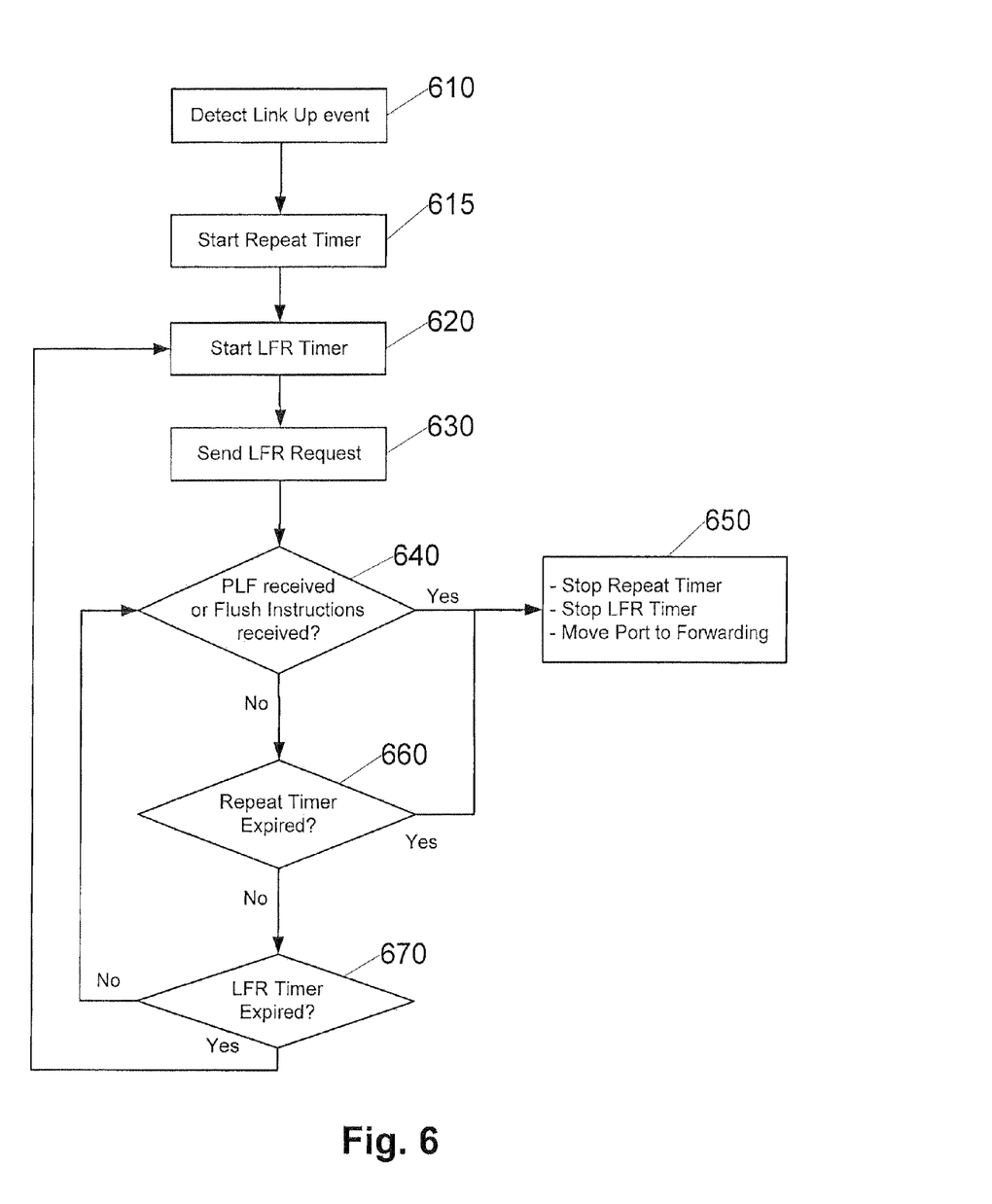
FIG. 6 presents a flow chart of a sequence of actions performed by a transit node during recovery after a single or multiple link failure in accordance with one aspect of the present invention.

FIG. 6 illustrates a sequence of actions performed by a transit node during recovery from single or multiple link failure in accordance with one aspect of the present invention. The process begins with the transit node detecting a link up event on one of its blocked ports, step 610. The transit node starts a repeat timer, step 615. The transit node then starts an LFR timer, step 620 and broadcasts an LFR Request message on its open port, step 630. If, in response to the LFR message, the transit node receives from the master node permission to move to link forward (PLF) on the blocked port or the instructions to flush its bridge table, step 640, the transit node may stop all timers and open the blocked port for data forwarding, step 650. If, in response to the LFR message, the transit node does not receive the PLF message or the flush instructions (which means that the link to the master node is blocked), the transit node may check whether the repeat timer has expired, step 660 and, if it has, may stop all timers and open the blocked port for data forwarding, step 650. If the repeat timer has not expired, step 660, the transit node may check if the LFR timer has expired, step 670. If the LFR timer has expired, step 670, the transit node may restart the LFR timer, step 620, and resend the LFR request, step 630. If the LFR timer has not expired, the transit node may check again if the PLF message or the flush instruction has been received from the master node, step 640 and, if it has, the transit node stops all timers and opens the blocked port to traffic forwarding, step 650. It should be noted that in alternative aspects, fewer or more timers may be used in connection with recovery from single or multiple link failures in a ring network.

As described above, aspects of the present invention support fault-tolerant, loop-free, and easily maintained networks by providing redundant data paths among network components, in which all but one of the data paths between any two components are blocked to network traffic, thereby preventing a network loop, and unblocking an appropriate redundant data path to maintain connectivity when a network component fails, or when a component is added to or removed from the network.

Figure 7:
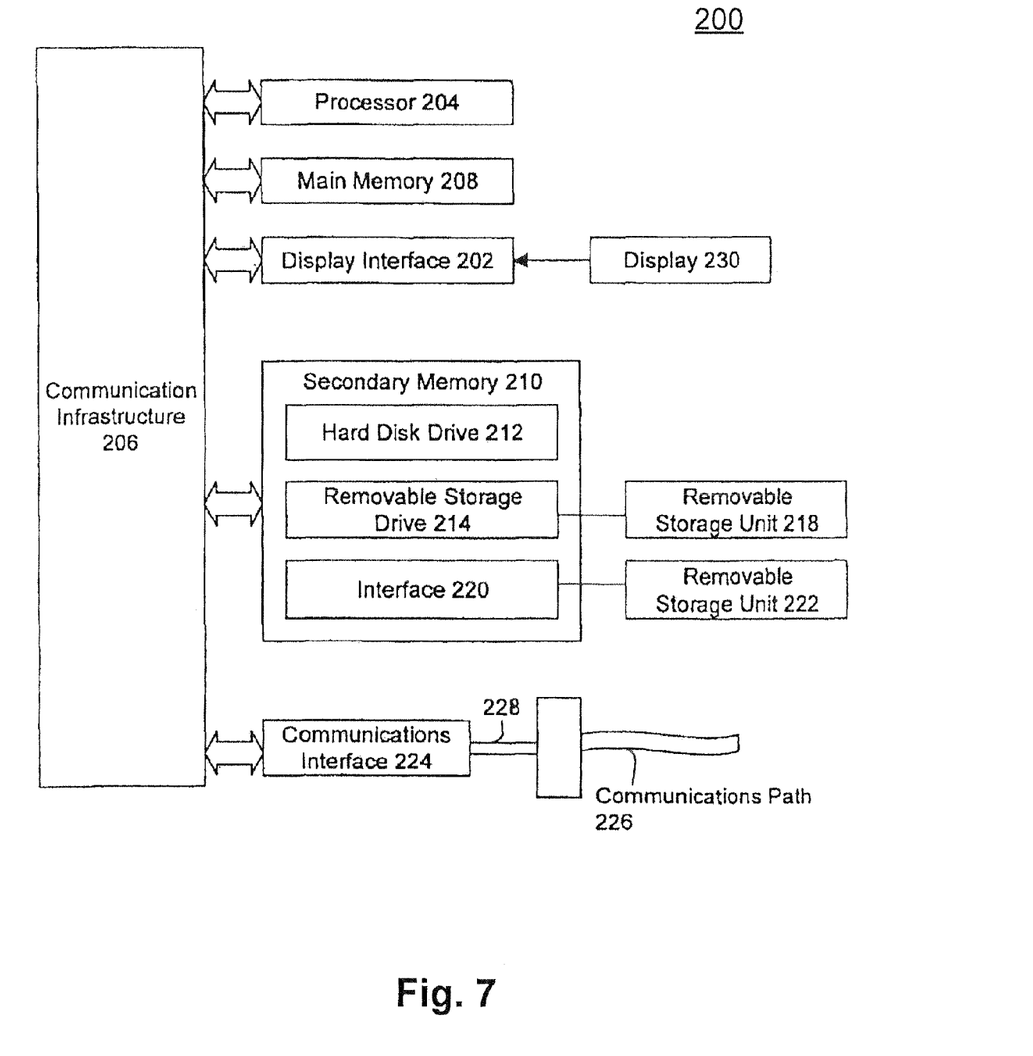
FIG. 7 shows various features of an example networked computer system for use in conjunction with various aspects of the present invention.

The present invention may be implemented using hardware, software or a combination thereof and may be implemented in one or more computer systems or other processing systems. In one aspect, the invention is directed toward one or more computer systems capable of carrying out the functionality described herein. An example of such a computer system 200 is shown in FIG. 7.

Computer system 200 includes one or more processors, such as processor 204. The processor 204 is connected to a communication infrastructure 206 (e.g., a communications bus, cross-over bar, or network). Various software implementations of the methods for network recovery are described herein in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a message buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative aspect, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In a variation where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another variation, the invention is implemented primarily in hardware using, for example, hardware components, such as application specific integrated circuits (ASICs). Implementation of the hardware state machine so as to perform the functions described herein will be apparent to persons skilled in the relevant art(s).

While the present invention has been described in connection with preferred aspects, it will be understood by those skilled in the art that variations and modifications of the aspects described above may be made without departing from the scope of the invention. Other variations will be apparent to those skilled in the art from a consideration of the specification or from a practice of the invention disclosed herein. It is intended that the specification and the described examples are considered exemplary only, with the true scope of the invention indicated by the following claims.

What we claimed is:

1. A method of network recovery from link failure, the network comprising a master node, a plurality of transit nodes and a plurality of links, each node having at least two ports, a link from the plurality of links coupling a first port of each node to a second port of another node, the method comprising:
    receiving from a transit node having a blocked port a request to open the blocked port for data forwarding, wherein the blocked port is associated with a restored link, and wherein upon transmission of the request, the transit node starts a repeat timer and a first timer;
    starting a health-check timer and transmitting a health-check message on a primary port of the master node to determine that all failed links of the network are restored;
    upon determining that the health-check message is received at a secondary port of the master node, transmitting a message to each transit node indicating that all failed links are restored; and
    upon determining that the health-check message is not received at the secondary port of the master node before the health-check timer lapsed, transmitting a message to the transit nodes to open the blocked port associated with the restored link for data forwarding,
    wherein, upon determining at the transit node that the first timer lapsed and a permission to open the blocked port is not received from the master node, the transit node restarts the first timer and retransmits the request to open the blocked port for data forwarding; and
    wherein, upon determining that the repeat timer lapsed and the permission to open the blocked port is not received from the master node, the transit node opens the blocked port of the transit node for data forwarding.

2. The method of claim 1, wherein the step of receiving a request for data forwarding further includes:
    extracting a unique identifier of the source transit node; and
    determining based on the extracted unique identifier if a request for data forwarding was previously received from the source transit node.

3. The method of claim 1, wherein transmitting a message to each transit node indicating that all failed links are restored further includes:
    flushing a bridge table of the master node; and
    transmitting a message to the plurality of transit nodes, each transit node having an associated bridge table, to flush each associated bridge table.

4. A method of network recovery from link failure, the network comprising a master node, a plurality of transit nodes and a plurality of links, each node having at least two ports, a link from the plurality of links coupling a first port of each node to a second port of another node, the method comprising:
    detecting a failed link associated with one of two ports of a transit node;
    blocking on the transit node a port associated with the failed link;
    upon determining that physical connectivity has been restored to the failed link, starting a repeat timer, starting a first timer and transmitting on the open port a request to open the blocked port for data forwarding;
    upon determining that a permission to open the blocked port is received from the master node before the first timer lapses, opening the blocked port of the transit node for data forwarding;
    upon determining that the first timer lapsed and a permission to open the blocked port is not received from the master node, restarting the first timer and retransmitting the request to open the blocked port for data forwarding; and
    upon determining that the repeat timer lapsed and a permission to open the blocked port is not received from the master node, opening the blocked port of the transit node for data forwarding.

5. The method of claim 4, further comprising:
    receiving from the master node a message indicating that all failed links are restored; and
    flushing a bridge table of the transit node in response to the received message.

6. A system for network recovery from link failure, the network comprising a master node, a plurality of transit nodes and a plurality of links, each node having at least two ports, a link from the plurality of links coupling a first port of each node to a second port of another node, the system comprising:
    means for receiving from a transit node having a blocked port a request to open the blocked port for data forwarding, wherein the blocked port is associated with a restored link and wherein, upon transmission of the request, the transit node starts a repeat timer and a first timer;
    means for starting a health-check timer;
    means for transmitting a health-check message on a primary port of the master node to determine that all failed links of the network are restored;
    means for transmitting a message to each transit node indicating that all failed links are restored upon determination that the health-check message is received at a secondary port of the master node; and
    means for transmitting a message to the plurality of transit nodes to open the blocked port associated with the restored link for data forwarding upon determination that the health-check message is not received at the secondary port of the master node before the health-check timer lapsed;
    wherein, upon determining at the transit node that the first timer lapsed and a permission to open the blocked port is not received from the master node, the transit node restarts the first timer and retransmits the request to open the blocked port for data forwarding; and
    wherein, upon determining that the repeat timer lapsed and the permission to open the blocked port is not received from the master node, the transit node opens the blocked port of the transit node for data forwarding.

7. The system of claim 6, further comprising:
    means for extracting a unique identifier of the source transit node; and means for determining based on the extracted unique identifier if a request for data forwarding was previously received from the source transit node.

8. The system of claim 6, further comprising:
means for flushing a bridge table of the master node; and
means for transmitting a message to the plurality of transit nodes, each transit node having an associated bridge table, to flush each associated bridge table.

9. A system of network recovery from link failure, the network comprising a master node, a plurality of transit nodes and a plurality of links, each node having at least two ports, a link from the plurality of links coupling a first port of each node to a second port of another node, the system comprising:
means for detecting a failed link associated with one of two ports of a transit node;
means for blocking on the transit node a port associated with the failed link; and
means for starting a repeat timer, starting a first timer and transmitting on the open port of the transit node a request to open the blocked port for data forwarding upon determining that physical connectivity has been restored to the failed link;
means for opening the blocked port of the transit node for data forwarding upon determining that a permission to open the blocked port is received from the master node before the first timer lapses;
means for restarting the first timer and retransmitting the request to open the blocked port for data forwarding upon determining that the first timer lapsed and the permission to open the blocked port is not received from the master node; and
means for opening the blocked port of the transit node for data forwarding upon determining that the repeat timer lapsed and permission to open the blocked port is not received from the master node.

10. The system of claim 9, further comprising:
means for receiving from the master node a message indicating that all failed links are restored; and
means for flushing a bridge table of the transit node in response to the received message.

11. A computer program product comprising a non-transitory computer usable medium having control logic stored therein for causing a computer to facilitate network recovery from link failure, the network comprising a master node, a plurality of transit nodes and a plurality of links, each node having at least two ports, a link from the plurality of links coupling a first port of each node to a second port of another node, the control logic comprising:
first computer readable program code means for receiving from a transit node having a blocked port a request to open the blocked port for data forwarding, wherein the blocked port is associated with a restored link and wherein, upon transmission of the request, the transit node starts a repeat timer and a first timer;
second computer readable program code means for starting a health-check timer;
third computer readable program code means for transmitting a health-check message on a primary port of the master node to determine that all failed links of the network are restored;
fourth computer readable program code means for transmitting a message to each transit node indicating that all failed links are restored upon determination that the health-check message is received at a secondary port of the master node; and
fifth computer readable program code means for transmitting a message to the transit nodes to open the blocked port associated with the restored link for data forwarding upon determination that the health-check message is not received at the secondary port of the master node before the health-check timer lapsed;
wherein, upon determining at the transit node that the first timer lapsed and a permission to open the blocked port is not received from the master node, the transit node restarts the first timer and retransmits the request to open the blocked port for data forwarding; and
wherein, upon determining that the repeat timer lapsed and the permission to open the blocked port is not received from the master node, the transit node opens the blocked port of the transit node for data forwarding.

12. The computer program product of claim 11, further comprising:
sixth computer readable program code means for extracting a unique identifier of the source transit node; and
seventh computer readable program code means for determining based on the extracted unique identifier if a request for data forwarding was previously received from the source transit node.

13. The computer program product of claim 11, further comprising:
eighth computer readable program code means for flushing a bridge table of the master node; and
ninth computer readable program code means for transmitting a message to the plurality of transit nodes, each transit node having an associated bridge table, to flush each associated bridge table.

14. A computer program product comprising a non-transitory computer usable medium having control logic stored therein for causing a computer to facilitate network recovery from link failure, the network comprising a master node, a plurality of transit nodes and a plurality of links, each node having at least two ports, a link from the plurality of links coupling a first port of each node to a second port of another node, the control logic comprising:
first computer readable program code means for detecting a failed link associated with one of two ports of a transit node;
second computer readable program code means for blocking on the transit node a port associated with the failed link;
third computer readable program code means for starting a repeat timer, starting a first timer and transmitting on the open port of the transit node a request to open the blocked port for data forwarding upon determining that physical connectivity has been restored to the failed link; and
fourth computer readable program code means for opening the blocked port of the transit node for data forwarding upon determining that a permission to open the blocked port is received from the master node before the first timer lapses;
sixth computer readable program code means for restarting the first timer and retransmitting the request to open the blocked port for data forwarding upon determining that the first timer lapsed and the permission to open the blocked port is not received from the master node; and
seventh computer readable program code means for opening the blocked port of the transit node for data forwarding upon determining that the second timer lapsed and permission to open the blocked port is not received from the master node.

15. The computer program product of claim 14, further comprising:

eighth computer readable program code means for receiving from the master node a message indicating that all failed links are restored; and ninth computer readable program code means for flushing a bridge table of the transit node in response to the received message.

* * * * *